US010791447B2

(12) United States Patent
Bryla et al.

(10) Patent No.: US 10,791,447 B2
(45) Date of Patent: Sep. 29, 2020

(54) SYSTEM AND METHOD FOR VERIFYING TACTICAL EQUIPMENT (71) Applicant: MOTOROLA SOLUTIONS, INC., Chicago, IL (US)

(72) Inventors: Mateusz Maciej Bryla, Cracow (PL); Patryk Stanislaw Chrabaszcz, Tarnow (PL); Adam Piotr Stanek, Nowy Sacz (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/339,307

(22) PCT Filed: Oct. 11, 2016

(86) PCT No.: PCT/PL2016/050047
§ 371 (c)(1),
(2) Date: Apr. 3, 2019

(87) PCT Pub. No.: WO2018/070888
PCT Pub. Date: Apr. 19, 2018

(65) Prior Publication Data
US 2020/0045529 A1 Feb. 6, 2020

(51) Int. Cl.
*H04W 4/90* (2018.01)
*H04W 4/80* (2018.01)
(Continued)

(52) U.S. Cl.
CPC .......... *H04W 4/90* (2018.02); *H04L 12/1895* (2013.01); *H04W 4/021* (2013.01); *H04W 4/80* (2018.02); *G01S 2205/002* (2013.01)

(58) Field of Classification Search
CPC ...................................... H04W 4/90
(Continued)

(56) References Cited

U.S. PATENT DOCUMENTS 6,999,783 B2    2/2006  Toyryla et al.
7,359,724 B2    4/2008  Torvinen
(Continued)

FOREIGN PATENT DOCUMENTS

WO      2005001669      1/2005

OTHER PUBLICATIONS

The Noun Project, "Creating, Shearing and Celebrating the World's Visual Language," website, 25 pages (Dec. 2010).
(Continued)

*Primary Examiner* — Joel Ajayi
(74) *Attorney, Agent, or Firm* — Michael Best & Friedrich LLP (57) ABSTRACT Hierarchically verifying tactical equipment (122, 124, 126, 128) associated with a group of communication devices (121, 131) including a lead device (111). One example includes validating radio-beacon-associated tactical equipment (122, 124, 126, 128) of each of a plurality of portable communication devices (121, 131) against a set of tactical equipment requirements (302) for each respective one of the plurality of portable communication devices (121, 131), validating an acquired set of available tactical equipment for the plurality of portable communication devices (121, 131) against a set of group tactical equipment requirements (304), responsive to determining that at least one of the plurality of portable communication devices (121, 131) fails to meet its respective set of tactical equipment requirements (302), determining that the plurality of portable communication devices fails to meet the set of group tactical equipment requirements (304), or both, and generating an alert message (703). The alert message may be transmitted to and displayed at the lead device (111).

19 Claims, 8 Drawing Sheets

(51) Int. Cl.
*H04L 12/18* (2006.01)
*H04W 4/021* (2018.01)

(58) Field of Classification Search
USPC .......................................... 455/424
See application file for complete search history.

(56) References Cited

U.S. PATENT DOCUMENTS

| | | |
|---|---|---|
| 7,801,506 B2 | 9/2010 | Haave et al. |
| 2008/0017709 A1 | 1/2008 | Kennedy |
| 2009/0312052 A1 | 12/2009 | Barbosa et al. |
| 2010/0177661 A1 | 7/2010 | Dailey |
| 2011/0006894 A1 | 1/2011 | Witwer et al. |
| 2014/0222522 A1* | 8/2014 | Chait ................ G06Q 10/0637 705/7.36 |
| 2014/0243034 A1 | 8/2014 | Gurney et al. |
| 2016/0063780 A1 | 3/2016 | Logan et al. |

OTHER PUBLICATIONS

PCT/PL2016/050047 International Search Report and Written Opinion of the International Searching Authority dated Apr. 20, 2017 (11 pages).

\* cited by examiner

SYSTEM AND METHOD FOR VERIFYING TACTICAL EQUIPMENT

BACKGROUND OF THE INVENTION

Public safety personnel (for example, police officers, firefighters, and the like) are typically designated to be part of one or more teams or groups that respond to an incident or emergency (for example, a crime scene, vehicle accident, fire, natural disaster, etc.). While responding to an emergency, public safety personnel may need to bring various tactical equipment to the incident scene.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Currently available systems and techniques for ensuring that needed tactical equipment is transported to and available at an incident scene are not always satisfactory. Often, such systems consist of simple, manual checklists. More robust and faster tactical equipment management systems may improve the readiness and response time of public safety personnel.

One exemplary embodiment provides a method for hierarchically verifying tactical equipment associated with a group of communication devices that includes a lead device. The method includes validating, with at least one electronic processor, radio-beacon-associated tactical devices of each of a plurality of portable communication devices against a set of tactical equipment requirements for each respective one of the plurality of portable communication device. The method also includes validating, with the at least one electronic processor or a second electronic processor, an acquired set of available tactical equipment for the plurality of portable communication devices against a set of group tactical equipment requirements. The method also includes responsive to determining that at least one of the plurality of portable communication devices fails to meet its respective set of tactical equipment requirements, or determining that the plurality of portable communication devices fails to meet the set of group tactical equipment requirements, or both, generating an alert message. The method also includes one selected from the group of transmitting, via an electronic transceiver, the alert message to the lead device.

Another exemplary embodiment provides a method for verifying a plurality of tactical equipment associated with one or more users of one or more portable communication devices. The method includes transmitting, with a first plurality of beacons, a first data associated with a first plurality of tactical equipment. The method includes receiving, with a first portable communication device, the first data associated with the first plurality of tactical equipment. The method also includes comparing, with an electronic processor, the first data associated with the first plurality of tactical equipment with a first equipment list to create a comparison, wherein the first equipment list includes a list of tactical equipment associated with the first portable communication device; and generating, with the electronic processor, a first status message based on the comparison.

Another exemplary embodiment provides a system for verifying tactical equipment. The system includes at least one electronic processor configured to validate radio-beacon-associated tactical equipment of each of a plurality of portable communication devices against a set of tactical equipment requirements for each respective one of the plurality of portable communication devices. The at least one electronic processor is also configured to validate an acquired set of available tactical equipment for the plurality of portable communication devices against a set of group tactical equipment requirements; generate an alert message in response to determining that at least one of the plurality of portable communication devices fails to meet its respective set of tactical equipment requirements, to determining that the plurality of portable communication devices fails to meet the set of group tactical equipment requirements, or both. The system further includes an electronic transceiver configured to transmit the alert message to a lead device.

Figure 1:
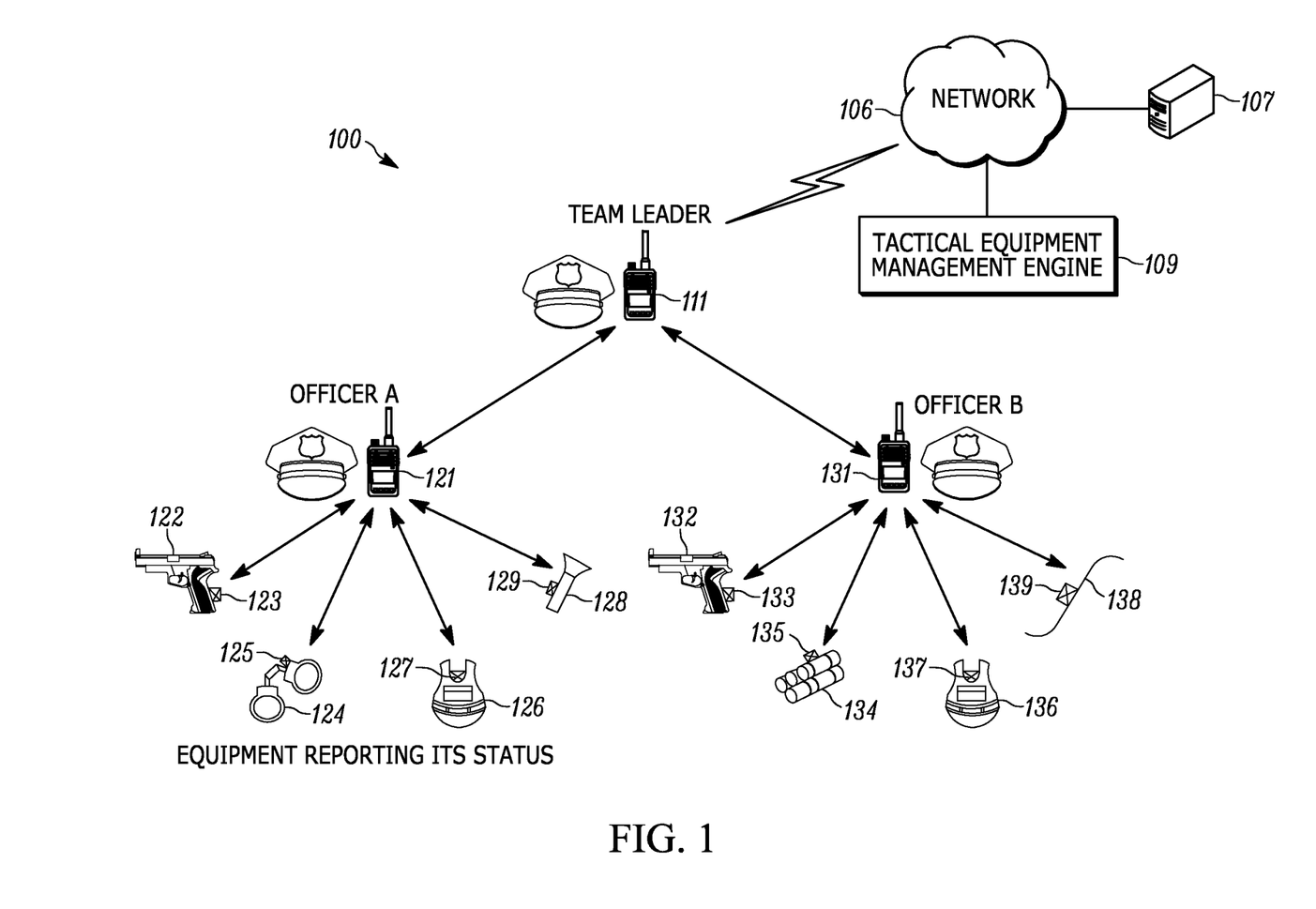
FIG. 1 is a block diagram of a tactical equipment management system in accordance with some embodiments.

FIG. 1 is a block diagram of a tactical equipment management system 100 in accordance with some embodiments. The tactical equipment management system 100 includes a network 106, a database 107, a tactical equipment management engine 109, a portable communication device 111 associated with a first responder or public safety individual, which in the example shown is a "TEAM LEADER." The tactical equipment management system 100 also includes a portable communication device 121 associated with another public safety individual, which in the example is "OFFICER A." The tactical equipment management system 100 also includes a portable communication device 131 associated with yet another public safety individual, which in the example is "OFFICER B." In addition, the tactical equipment management system 100 may also include a gun 122 having a beacon 123, a pair of handcuffs 124 having a beacon 125, a vest 126 having a beacon 127, a flashlight 128 having a beacon 129, a gun 132 having a beacon 133, an explosive device 134 having a beacon 135, a vest 136 having a beacon 137, and a crowbar 138 having a beacon 139. The beacons 123, 125, 127, and 129 are configured to communicate with the portable communication device 121 and the beacons 133, 135, 137 and 139 are configured to communicate with the portable communication device 131. In some embodiments, the beacons 123, 125, and 127 may include an electronic processor configured to process signals transmitted to and received from the portable communication device 121. In some embodiments, the beacons 123, 125, 127, 129, 133, 135, 137, and 139 may be integrated into or may be part of the tactical equipment 122, 124, 126, 128, 132, 134, 136, and 138, respectively, that they are associated with. The messages wirelessly received from the beacons 123, 125, 127, 129, by the portable communication device 121 and the messages wirelessly received from beacons 133, 135, 137, and 139 by portable communication device 131 may indicate a status of the tactical equipment associated with the beacons. For example, the status can be (i) available (or present) status, (ii) a lost beacon status, which is determined when the present indicator is not received at the portable communication devices 121 and portable communication devices 131, and (iii) a damaged or depleted status. In one embodiment, the damaged or depleted state may be set to a logical true when, for example, there is only five percent (5%) ammunition remaining in an ammunition clip or magazine of a gun.

In some embodiments, the portable communication devices 121 and 131 are configured to wirelessly communicate tactical equipment information (such as the list and/or type of tactical equipment in the possession of public safety personnel) with the portable communication device 111, which is associated with the TEAM LEADER.

The network 106 facilitates communications between portable communication devices 111, 121, and 131, the database 107, and the tactical equipment management engine 109. The network 106 may comprise one of a number of over-the-air networks. For example, the network 106 may comprise a private network, for example an Institute of Electrical and Electronics Engineers (IEEE) 802.11 standard network, set up by a building operator, a next-generation cellular communications network operated by a cellular service provider, or a public-safety network, for example an association of public safety communications officials (APCO) Project 25 (P25) network.

The database 107 in FIG. 1 is shown external to the tactical equipment management engine 109. However, the database 107 may lie internal to tactical equipment management engine 109. The database 107 comprises random access memory and is used to store information related to public safety personnel, for example, OFFICER A, OFFICER B, and the TEAM LEADER and their associated equipment, for example, gun 122, handcuffs 124, vest 126, gun 132, explosive device 134, portable communication device 131, etc. In some embodiments, the database 107 includes the following information:

Public safety personnel at the incident scene—This information may be updated and stored in the database 107 in real time and may be obtained directly from equipment associated with the public safety personnel transmitting location information. Alternatively, the public safety personnel information may be obtained from a dispatch center that assigns public safety personnel to the incident scene;

Tactical equipment associated with the public safety personnel that may be needed at the incident scene—This information is preferably pre-populated in the database 107, and may be updated in real time by obtaining information from a dispatch center or by dynamically discovering and querying equipment at the scene;

Capabilities of the public safety personnel at the incident scene. This information is preferably pre-populated in the database 107 and includes, for example, a rank of each public safety individual at the incident scene, training of each public safety person at the incident scene, role of each public safety individual at the incident scene, clearance levels of each public safety individual at the incident scene, certifications of each public safety individual at the incident scene, etc.; and Capabilities of the equipment associated with the public safety personnel at the incident scene. This information is preferably pre-populated in the database 107 or dynamically discovered from equipment at the scene and includes, for example, information regarding whether a piece of equipment has the capacity/capability to control a particular resource. For example, if a flashlight has a battery with a low charge level or a gun is low on ammunition, that piece of tactical equipment will be deemed to be unavailable for a certain operation.

In some embodiments, the tactical equipment management engine 109 may include an electronic processor (not shown in FIG. 1) and that can be implemented in hardware and software and that is configured to:

construct rules for intelligently pairing tactical equipment to each public safety individual and/or group involved in the incident—either physically present at the incident or in a remote location;

connect tactical equipment to public safety personnel and/or group involved in the incident, according to the above constructed rules;

store public safety personnel profiles for use in the construction of the pairing rules; and dynamically maintain a public safety individual and/or a group profile data, based on of presence/assignment of a public safety individual and/or a group at the incident and configuration information of the public safety individual's and/or group's equipment.

In some embodiments, the tactical equipment management engine 109 examines properties of both tactical equipment supporting incident operations and profiles for public safety personnel in order to match resources to the most relevant public safety personnel involved in the incident. In one example, tactical equipment properties includes:

type of tactical equipment (for example handcuffs, vest, gun, surveillance cameras, robots, drones, toxic gas sensors, wind direction detectors, explosive devices, crowbar, flashlight, etc.);

tactical equipment model;

location of the tactical equipment, availability of the tactical equipment, etc.; and security level/requirements.

In some embodiments, the tactical equipment management engine 109 may pair public safety personnel by:

accessing the database 107 to determine a rank of a public safety individual on scene, and pair a resource or equipment to the public safety individual based on his or her rank such that higher-ranked public safety personnel on scene are granted control of the resource or equipment before lower-ranked public safety personnel;

accessing the database 107 to determine a security/authorization level of a public safety individual on scene such that a security-constrained resource or tactical equipment is only granted to public safety personnel meeting the security requirements; and/or accessing the database 107 to determine the role (Incident Commander, First Responder, Firefighter, police, etc.) played by the public safety personnel on scene such that role-based access to an appropriate resource or tactical equipment is granted.

Figure 2:
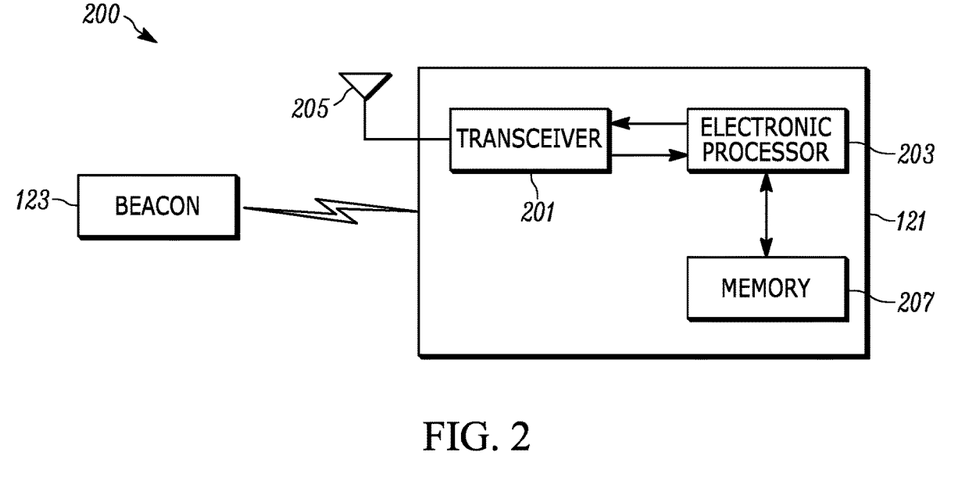
FIG. 2 is a block diagram of beacon system in accordance with some embodiments.

FIG. 2 is a block diagram of beacon system 200 in accordance with some embodiments. The beacon system 200 includes a beacon 123 and the portable communication device 121. The portable communication device 121 includes an antenna 205, a transceiver 201, an electronic processor 203 and a memory 207. The electronic processor 203 is coupled to the transceiver 201 and the memory 207. The antenna 205 is coupled to the transceiver 201 and is configured to wirelessly send and receive signals to and from the beacon 123 and the network 106 (shown in FIG. 1). In some embodiments, the transceiver 201 may be a long-range transceiver that utilizes the association of public safety communications officials Project 25 communication protocol. In other embodiments, transceiver 201 may utilize other protocols, for example the IEEE 802.11 communication protocol (for all referenced IEEE standards herein, see: http://standards.ieee.org/getieee802/index.html or contact the IEEE at IEEE, 445 Hoes Lane, Piscataway, N.J. 08855, USA), Bluetooth protocol, or High Performance Radio Local Area Network (HiperLAN) protocols, or others. The transceiver 201 may be utilized to provide updates on public safety personnel at the incident scene, equipment associated with the public safety personnel at the incident scene, capabilities of the public safety personnel at the incident scene (for example, clearance levels of public safety personnel, role played at incident, public safety personnel rank, training, certifications, etc.), capabilities of the equipment associated with the public safety personnel at the incident scene (for example, whether the equipment has the capability to control a particular resource), and the resources that may be available at the incident scene.

In one example, during operation, the tactical equipment management engine 109 receives information via one or more of the portable communication device 111, portable communication device 121 and portable communication device 131 indicating which public safety personnel are at a particular incident scene and what equipment associated with the public safety personnel are available at the incident scene. Information as to what equipment is assigned to which public safety personnel on the scene is also received, or may be pre-populated in the database 107. The tactical equipment management engine 109 may also receive information as to what other equipment and/or resources (for example, other public safety personnel) are located at the incident scene. This information may be received from one or more portable communication devices (for example, communication device 111 in FIG. 1) or a dispatch center or may be pre-populated in the database 107.

Figure 3:
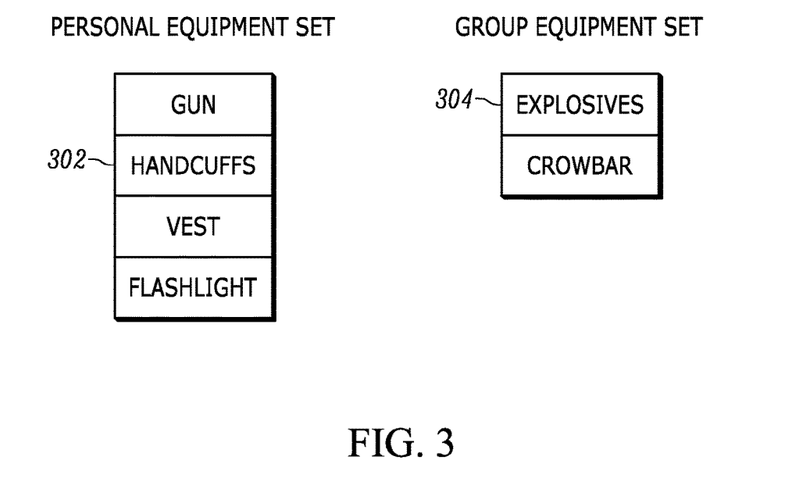
FIG. 3 illustrates various equipment lists in accordance with some embodiments.

FIG. 3 illustrates various tactical equipment lists in accordance with some embodiments. In one example of the tactical equipment management engine 109, two tactical equipment lists may be utilized such as the personal equipment set 302 and the group equipment set 304. Each of the personal equipment set 302 and group equipment set 304 form one or more sets of tactical equipment requirements for the tactical equipment associated with public safety individuals (for example, OFFICER A and OFFICER B in FIG. 1). In the example shown in FIG. 3, the personal equipment set 302 may include a gun, a pair of handcuffs, a vest, a flashlight. Similarly, the group equipment set 304 may include an explosive device and a crowbar. Each public safety individual may be responsible for bringing to an incident scene (at a minimum) the tactical equipment listed in the personal equipment set 302. Some public safety personnel might be entrusted with carrying additional tactical equipment such as an explosive device or a crowbar in addition to the tactical equipment listed in the personal equipment set 302. Additionally, each team of public safety personnel is also responsible for bringing to an incident scene the tactical equipment listed in the group equipment set 304. In some embodiments, the personal equipment set 302 is stored and maintained in the portable communication device 111, the portable communication device 121 or the portable communication device 131. In other embodiments, the personal equipment set 302 and the group equipment set 304 are stored and maintained at the tactical equipment management engine 109 or the database 107.

Figure 4:
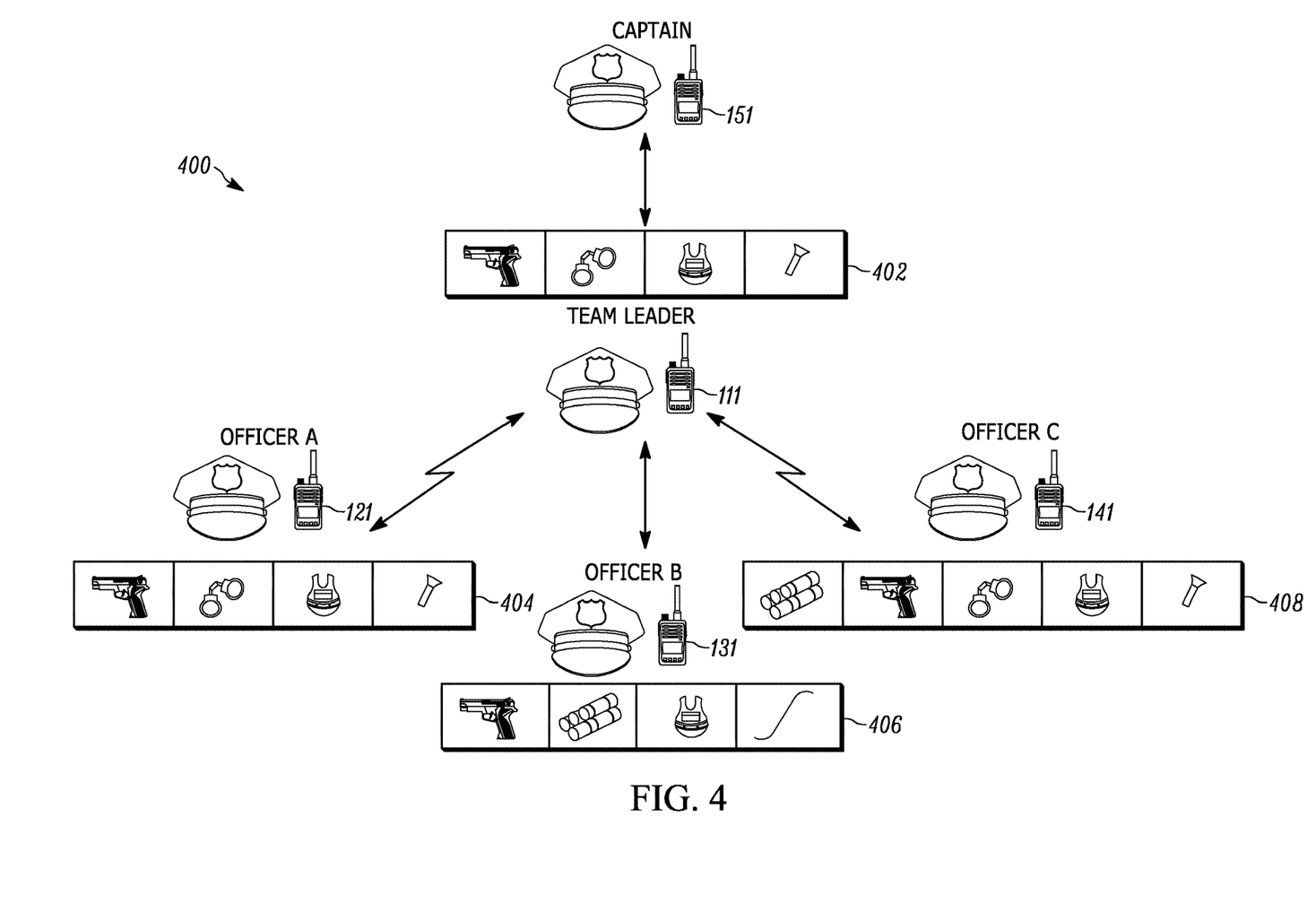
FIG. 4 is a block diagram of hierarchical tactical equipment management system in accordance with some embodiments.
Figure 5:
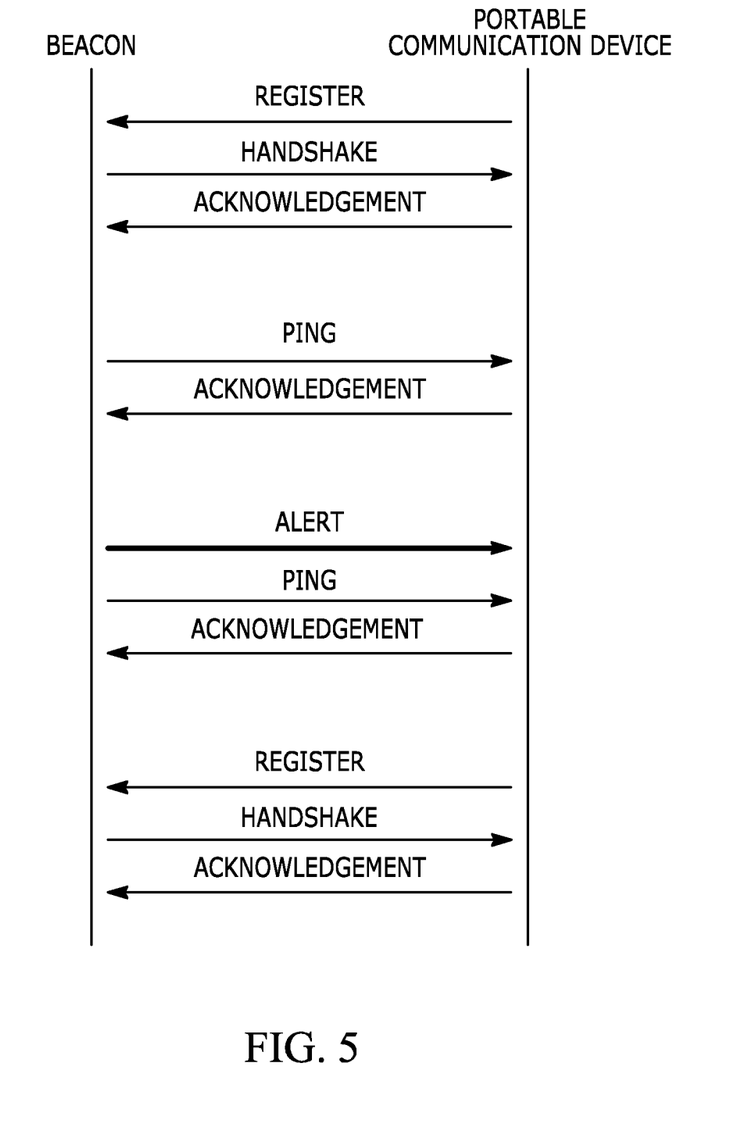
FIG. 5 illustrates communication messages between the beacon and the radio in accordance with some embodiments.

FIG. 4 is a block diagram of hierarchical tactical equipment management system 400 in accordance with some embodiments. The hierarchical tactical equipment management system 400 includes the portable communication devices 111, the portable communication device 121, and the portable communication device 131, each of which is configured to receive beacon signals from the tactical equipment associated with the TEAM LEADER, OFFICER A, and OFFICER B, respectively and generate a corresponding personal equipment list (for example, 404, 406 and 408). In the example shown in FIG. 4, the personal equipment list 404 associated with OFFICER A is communicated to the Team leader using the portable communication devices 121 and 111. The personal equipment list 406 associated with OFFICER B is communicated to the Team leader using the portable communication device 131 and the portable communication device 111. The personal equipment list 408 associated with the OFFICER C is communicated to the TEAM LEADER using the portable communication device 141 and the portable communication device 111. In some embodiments, the personal equipment list 402 associated with TEAM LEADER can also be communicated to the portable communication device 121, the portable communication device 131, and the portable communication device 141. In one example, the portable communication device 121 (carried by OFFICER A) is configured to compare the personal equipment list 404 associated with the portable communication device 121 with the personal equipment set 302 (in FIG. 3). Upon comparison, the portable communication device 121 is capable of generating an alert message based on the comparison and transmits the alert message to portable communication device 111 (carried by the TEAM LEADER). In some embodiments, the alert message may include the missing tactical equipment (in this case, there is no tactical equipment missing). In some embodiments, the alert message may include the additional tactical equipment (in this case, there is no additional tactical equipment available) that is in the possession of OFFICER A. In another example, the portable communication device 141 (carried by OFFICER C) is configured to compare the personal equipment list 408 associated with the portable communication device 141 with the personal equipment list FIG. 5 illustrates communication between a beacon (for example, any of the beacons 123, 125, 127, 129, 133, 135, 137, 139 shown in FIG. 1) and a portable communication device (for example, any one of portable communication devices 111, 121, 131, and 141 shown in FIG. 1) in accordance with some embodiments. As shown in FIG. 5, the portable communication device sends a register broadcast signal that may be received by all the beacons that are located in with reception range of the respective portable communication device. In some embodiments, the beacons may be part of a personal area network (PAN) and the reception range is relatively short, for example, ten (10) feet or less. Upon receiving the register broadcast signal, the beacon sends a handshake signal back to the portable communication device, which then responds with an acknowledgement signal back to the beacon. The beacon and portable communication device are paired with each other upon the completion of each of the register, handshake, and acknowledgement steps. Once the pairing is completed, in some embodiments, the beacon is configured to send a ping message to the portable communication device at period intervals (for example, every five (5) seconds) to validate that the beacon (and as a result the tactical equipment associated with the beacon) is available and in close proximity to the user of the portable communication device. In reply to the ping message received from the beacon, the portable communication device provides an acknowledgement message back to the beacon. In the event an acknowledgement message is not received by the beacon, then the beacon may determine that the portable communication device has disconnected communication with the beacon. In some embodiments, the portable communication device can issue a request to the beacon in order to receive the state of beacon by repeating the registration process. As shown in FIG. 5, the paired portable communication device and the beacon are configured to be able to communicate an alert from the beacon to the portable communication device. One example of a handshake and an alert is provided below:

```
Example handshake: {
"device": "Glock 17",
"manufacturer": "Glock G.m.b.H."
"ammunition": {
    "type": "9x19 PARA",
    "capacity": "15",
    "rounds": "10"
    }
}
Example alert (triggered by low rounds): {
"device": "Glock 17",
"alert": "low ammunition"
"ammunition": {
    "type": "9x19 PARA",
    "capacity": "15",
    "rounds": "3"
    }
}
```

Figure 6:
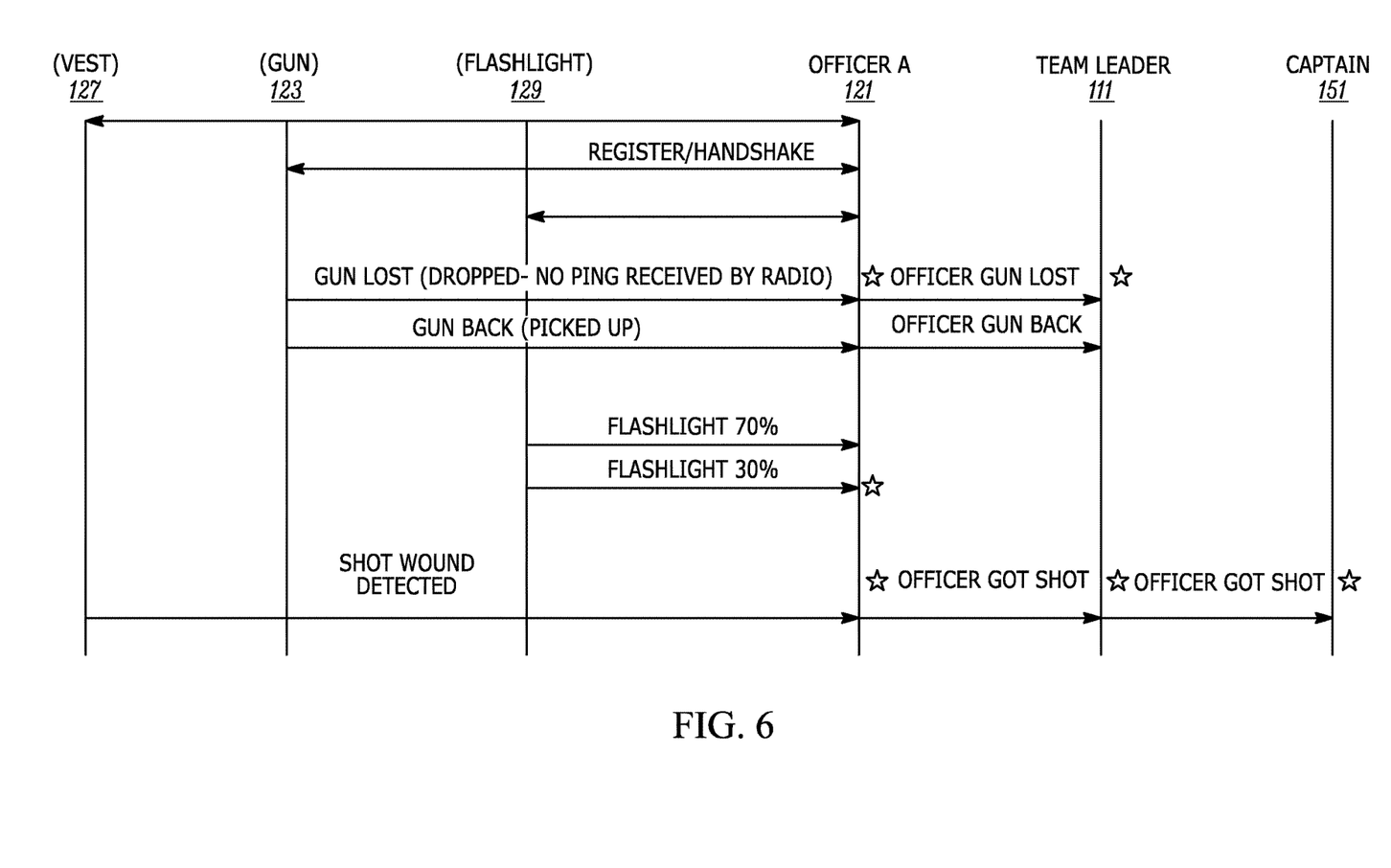
FIG. 6 illustrates messaging between the several beacons and radios in accordance with some embodiments.

FIG. 6 illustrates messaging between the beacons 127, 123 and 129 and the portable communication devices 121 and 111, in accordance with some embodiments. As shown in FIG. 6, beacon 127, which is associated with a vest 126; a beacon 123, which is associated with a gun 122; and a beacon 129, which is associated with a flashlight 128 communicates with portable communication device 121 of the OFFICER A. In addition, the portable communication device 121 is associated with the OFFICER A, the portable communication device 111 is associated with a Team leader, and portable communication device 151 is associated with a CAPTAIN. The beacons 127, 123, and 129 are configured to communicate with the portable communication device 121, which is associated with a public safety individual (for example, OFFICER A in FIG. 1).

In the example shown in FIG. 6, the beacons 127, 123, and 129 initially complete registering and handshaking with the portable communication device 121 before being able to transfer messages to the portable communication device 121. In one example, when the gun 122 is dropped by the OFFICER A, then portable communication device 121 will not receive any pings from the beacon 123. As a result, the portable communication device 121 of the OFFICER A will send a message to the portable communication device TR to inform the TEAM LEADER that the OFFICER A's gun 122 has been lost. When the OFFICER A retrieves the gun 122 then the pings generated at the beacon 123 will be received by the portable communication device 121. Consequently, the portable communication device 121 will be able to send a message to the portable communication device 111 informing the TEAM LEADER that the gun 122 has been retrieved.

In some embodiments, a status of the tactical equipment may be sent by the beacon associated with the tactical equipment to a portable communication device. For example, the charge level (for example, 70% or 30%) in a flashlight 128 may be communicated by a beacon 129 associated with the flashlight 128 to the portable communication device 121. In some embodiments, a change in status of the tactical equipment (for example, drop in charge in flashlight 128 from 70% to 30%) creates an alert that is communicated to the portable communication device 121 thereby warning OFFICER A that the amount of charge in flashlight 128 has dropped below a predetermined or preprogrammed threshold defined either in the portable communication device 121 or the tactical equipment management engine 109. In another example, when an officer receives a gun shot in the vest 126, the beacon 127 associated with the vest 126 may be configured to send a message to the portable communication device 121 that the OFFICER A has been shot. This message is further communicated by the portable communication device 121 to the portable communication device 111 associated with the Team leader to inform the team leader that the OFFICER A has been shot. Following which, the portable communication device 111 will communicate to the portable communication device 151 associated with the CAPTAIN to inform the CAPTAIN that an OFFICER has been shot.

Figure 7:
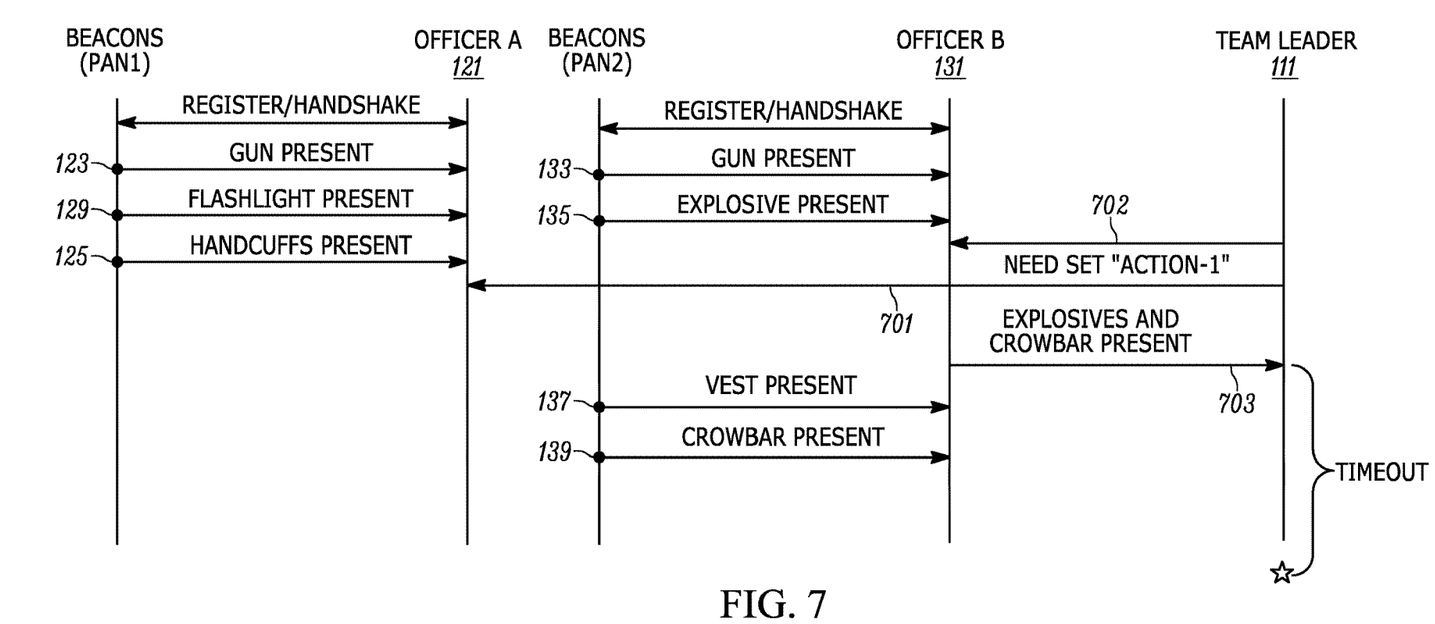
FIG. 7 illustrates messaging between several beacons and radios in accordance with some embodiments.

FIG. 7 illustrates messaging between beacons in different personal area networks (PAN1 and PAN2) and the portable communication devices 121, 131, and 111 in accordance with some embodiments. In one example, the beacon 123, the beacon 129, and the beacon 125 associated with a personal area network (PAN1) pairs up with the portable communication device 121 associated with the OFFICER A. The beacons in personal area network PAN1 send messages for example, that a gun 122 is present, a flashlight 128 is present, or a pair of handcuffs 124 is present to the portable communication device 121. Similarly, the beacon 133, the beacon 135, the beacon 137 and the beacon 139 associated with another personal area network (PAN2) pairs up with the portable communication device 131 associated with the OFFICER B. The beacons 133, 135, 137, and 139 in personal area network PAN2 send messages for example, that the gun 132 is present, the explosive device 134 is present, the vest 136 is present and the crowbar 138 is present to portable communication device 131. In one embodiment, the TEAM LEADER sends an action message 701 to the portable communication device 121 and an action message 702 to the portable communication device 131. The action messages 701 and 702 requests portable communication devices 121 and 111, respectively to identify any available tactical equipment that is part of the group equipment set 304 (shown in FIG. 3 that lists explosive device, and crowbar). The portable communication device 131 associated with the OFFICER B will in return indicate to the TEAM LEADER via a message to the portable communication device 111 stating that an explosive device 134 and a crowbar 138 are present and available for use. In one example, the portable communication device 121 associated with the OFFICER A, may inform the portable communication device 111 associated with the Team leader that it does not have an explosive device or a crowbar associated with it that is may be available for use.

FIG. 7 also illustrates an example of a method of verification of a group equipment list. In this example, all tactical equipment (using associated beacons) registers with the respective portable communication devices of OFFICER A and OFFICER B. In one example, the TEAM LEADER selects with his/her portable communication device 111 a particular group equipment requirements using a group equipment set (for example, 304) for an emergency response and transmits the same to the portable communication devices 121 and 131 belonging to OFFICER A and OFFICER B, respectively. The portable communication devices 121 and 131 inform the TEAM LEADER whether the necessary equipment is present based on the received pings from the respective beacons associated with tactical equipment. When all presence notifications are not received within a particular time frame, a missing tactical equipment alert is raised and reported to the TEAM LEADER.

Figure 8:
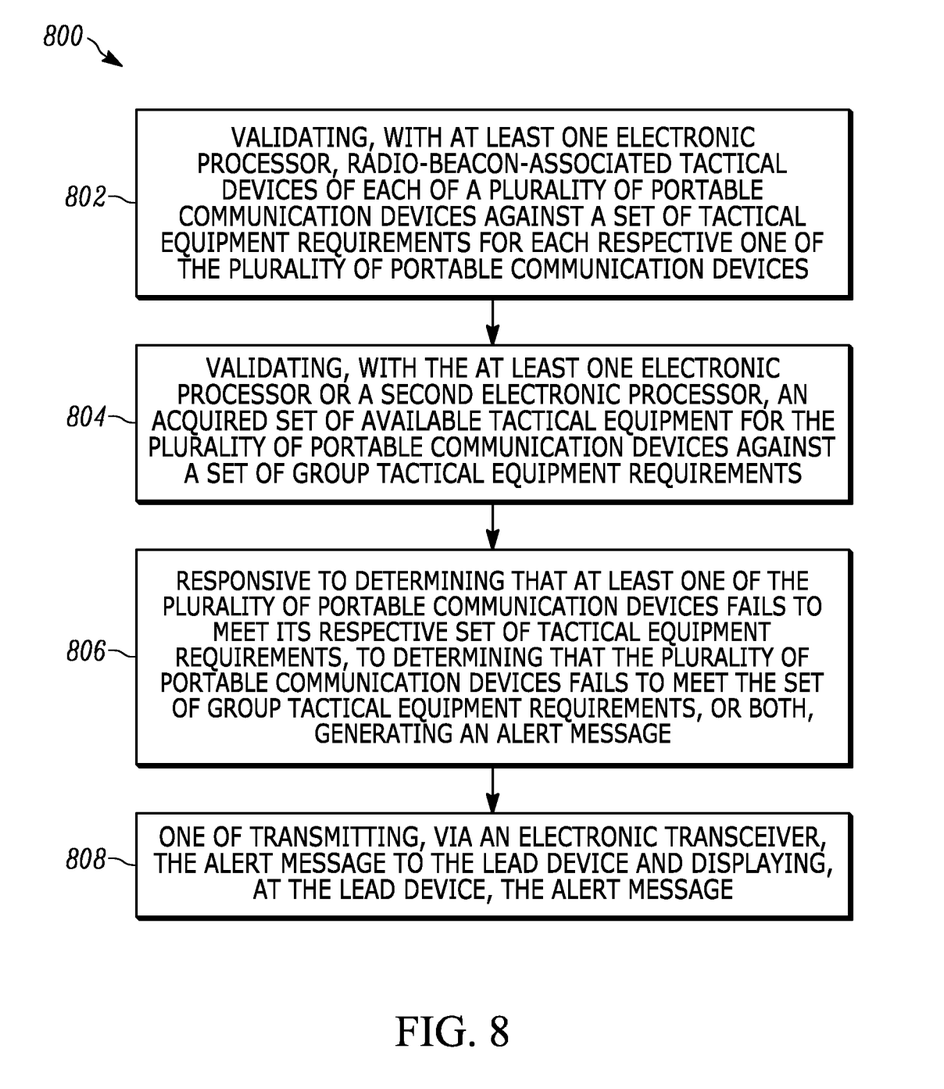
FIG. 8 is a flow chart of a method for hierarchically verifying tactical equipment for a group of communication devices that includes a lead device, in accordance with some embodiments.

FIG. 8 shows a flow chart of a method 800 for hierarchically verifying tactical equipment associated with a group of communication devices that includes a lead device. At block 802, the method 800 includes validating, with at least one electronic processor (for example, the electronic processor 203 residing within portable communication device 121), radio-beacon-associated tactical equipment (for example, gun 122, handcuffs 124, vest 126, etc.) against a set of tactical equipment requirements (for example, a set of tactical equipment required as per the personal equipment set 302 or a set of tactical equipment required as per the group equipment set 304) for each respective one of the plurality of portable communication devices (for example, 121, 131). In some embodiments, the electronic processor may be included within the tactical equipment management engine 109 (shown in FIG. 1).

At block 804, the method 800 includes validating, with the at least one electronic processor or a second electronic processor (for example, an electronic processor residing within at least one of portable communication devices 111 and 141), an acquired set of available tactical equipment (for example, personal equipment list 404 associated with OFFICER A and personal equipment list 408 associated with OFFICER C, as shown in FIG. 4) for the plurality of portable communication devices 121 and 131 (shown in FIG. 4) against a set of group tactical equipment requirements (for example, the group equipment set 304 shown in FIG. 3).

At block 806, the method 800 includes responsive to determining that at least one of the plurality of portable communication devices fails to meet its respective set of tactical equipment requirements, to determining that the plurality of portable communication devices fails to meet the set of group tactical equipment requirements, or both, generating an alert message. In an example, an alert message may be generated based on comparison of the personal equipment list (for example, 408) associated with a portable communication device 141 with at least one of a personal equipment set 302 or a group equipment set 304. In this case, the comparison shows that the personal equipment set 302 has an additional tactical equipment (an explosive device) over and above the list of tactical equipment required according to the personal equipment set 302. Consequently, an alert is generated either at the portable communication device 141 or a tactical equipment management engine 109 (shown in FIG. 1) and communicated to the TEAM LEADER. Similarly, an another alert may be generated after a comparison between the personal equipment list 408 and the group equipment set 304. In this case, the comparison shows that the tactical equipment list fails to meet the group equipment set 304 requirements because a crowbar is missing among all the tactical equipment associated with portable communication device 141.

At block 808, the method 800 includes one of transmitting, via an electronic transceiver, the alert message to the lead device. In some embodiments, the method 800 includes displaying, at the lead device, the alert message. In an example, the lead device may be the portable communication device 111 associated with a TEAM LEADER (shown in FIG. 4). In an another example, the lead device may be the portable communication device 151 associated with a CAPTAIN (shown in FIG. 4).

In some embodiments, the method 800 includes transmitting both the set of personal equipment requirements and the set of group tactical equipment requirements from the tactical equipment management engine 109 to each of the plurality of portable communication devices (for example, 111, 121, and 131 in FIG. 1). In alternate embodiments, the set of group tactical equipment requirements (for example, 304) are transmitted from the portable communication device 111 associated with the TEAM LEADER to the portable communication devices 121 and 131 associated with OFFICER A and OFFICER B, respectively, as shown in FIG. 1.

Figure 9:
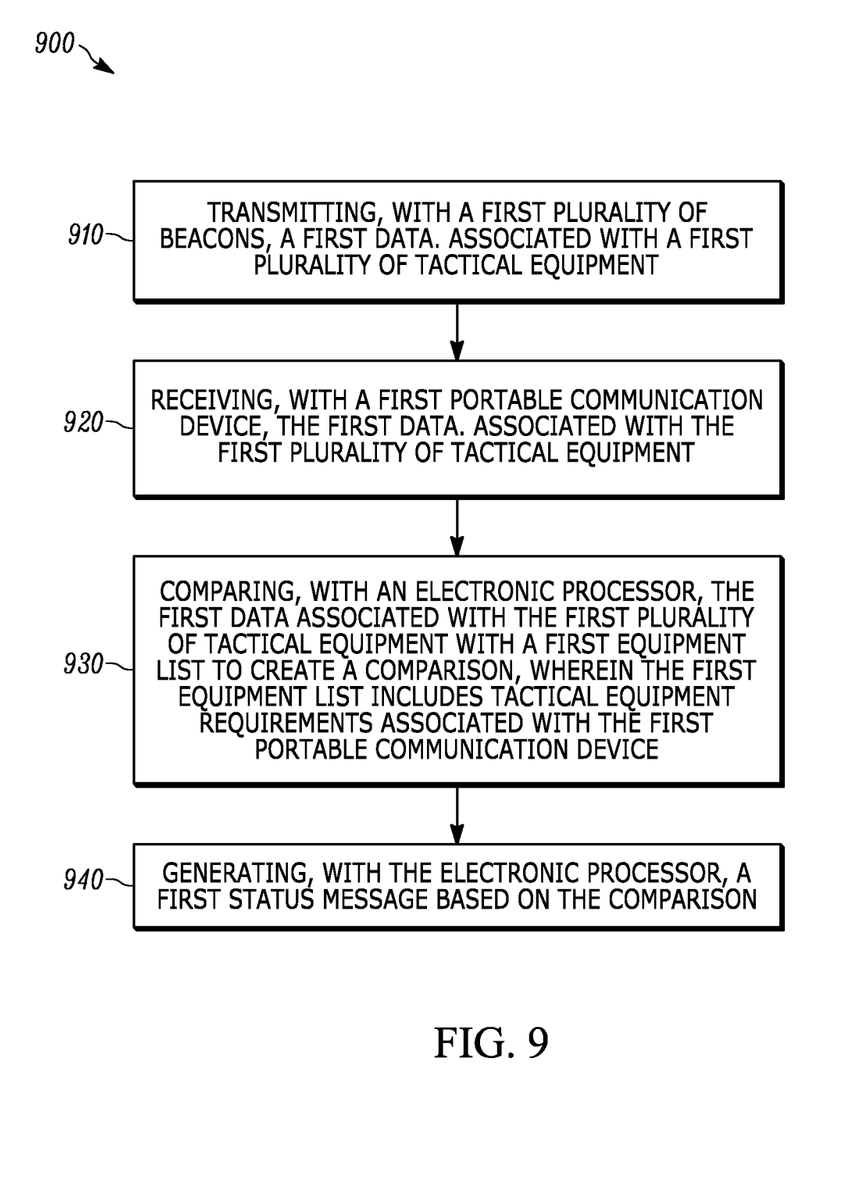
FIG. 9 is a flow chart of a method for verifying a plurality of tactical equipment associated with a user of a portable communication device, in accordance with some embodiments.

FIG. 9 is a flow chart of a method 900 for verifying a plurality of tactical equipment associated with a user of a portable communication device, in accordance with some embodiments.

At block 910, the method 900 includes transmitting, with a first plurality of beacons, a first data associated with a first plurality of tactical equipment. At block 920, the method 900 includes receiving, with a first portable communication device 121, the first data associated with the first plurality of tactical equipment (for example, gun 122, handcuffs 124, vest 126 and flashlight 128 as shown in FIG. 1). At block 930, the method includes comparing, with an electronic processor 203, the data associated with the first plurality of tactical equipment 122, 124, 126, 128 with a first equipment set (for example, 302 in FIG. 3) to create a comparison, wherein the first equipment list includes tactical equipment requirements associated with the first portable communication device. At block 940, the method 900 includes generating, with the electronic processor 203, a first status message based on the comparison performed in block 930. In some embodiments, method 900 includes receiving the first status message at a second portable communication device (for example, 111 in FIG. 1). In one example, the first status message may include a message indicating that the plurality of tactical equipment associated with a portable communication device that are readily available is compliant or non-compliant with either a personal tactical equipment requirement (for example, the list of tactical equipment shown in personal equipment set 302).

In some embodiments, method 900 includes transmitting, with a second plurality of beacons (for example 133, 135, and 137 in FIG. 1), data associated with a second plurality of tactical equipment (gun 132, explosive device 134, and vest 136 in FIG. 1). The method 900 also includes receiving, with the portable communication device 131, the data associated with the second plurality of tactical equipment (gun 132, explosive device 134, and vest 136 in FIG. 1). The method 900 further includes comparing, with an electronic processor (located either within the portable communication device 111 or within the tactical equipment management engine 109), the data associated with the first and second plurality of tactical equipment with a second equipment set (for example, 304 in FIG. 3), wherein the second equipment list is associated with a group of portable communication device users. The method 900 includes generating, with the electronic processor, a second status message based on comparing the data associated with the first and second plurality of tactical equipment with the second equipment list. In one example, the first status message may include a message indicating that the plurality of tactical equipment associated with a portable communication device that are readily available is compliant or non-compliant with either a group tactical equipment requirement (for example, the list of tactical equipment shown in group equipment set 304).

It should be noted that a plurality of hardware and software based devices, as well as a plurality of different structural components may be utilized to implement the invention. As described above, embodiments of the invention provide systems and methods for verifying a plurality of tactical equipment associated with one or more users of one or more portable communication devices. In some embodiments, the invention provides a software application that is executable on a personal computing device, such as a smart phone, tablet computer, smart watch, etc. In some embodiments, the software application can be stored and executed by a remote computing device, such as a server. In particular, the software application can be executed by a server, and a user can access and interact with the software application using a portable communication device. Also, in some embodiments, functionality provided by the software application as described above can be distributed between a software application executed by a user's portable communication device and a software application executed by a server external to the portable communication device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for verifying tactical equipment associated with a plurality of portable communication devices that includes a lead device, the plurality of portable communication devices associated with a public safety team responding to an incident, the method comprising:
   wirelessly coupling at least one of a plurality of tactical equipment with each of the plurality of portable communication devices using a plurality of beacons, each of the plurality of beacons associated with one of the plurality of tactical equipment and configured to wirelessly transmit messages indicating a status of its associated tactical equipment to the portable communication device coupled to its tactical equipment;
   validating, with at least one electronic processor and based on the messages, the at least one of the plurality of tactical equipment wirelessly coupled to each of the plurality of portable communication devices against a set of tactical equipment requirements for a member of the public safety team associated with each respective one of the plurality of portable communication devices;
   validating, with the at least one electronic processor or a second electronic processor, an acquired set of available tactical equipment for the plurality of portable communication devices against a set of group tactical equipment requirements for the incident;
   responsive to determining at least one selected from the group consisting of a failure of at least one of the plurality of portable communication devices to meet its respective set of tactical equipment requirements and a failure of the plurality of portable communication devices to meet the set of group tactical equipment requirements, generating an alert message; and
   one of selected from a group consisting of transmitting, via an electronic transceiver, the alert message to the lead device associated with a leader of the public safety team and displaying, at the lead device, the alert message.

2. The method of claim 1, wherein determining that at least one of the plurality of portable communication devices fails to meet its respective set of tactical equipment requirements includes comparing a tactical equipment list associated with each of the at least one of the plurality of portable communication devices with at least one of the set of tactical equipment requirements and the set of group tactical equipment requirements.

3. The method of claim 1, further comprising:
   transmitting a register broadcast signal with the plurality of portable communication devices.

4. The method of claim 3, further comprising:
   receiving a handshake signal from the plurality of tactical equipment.

5. The method of claim 1, further comprising:
   transmitting the set of group tactical equipment requirements to each of the plurality of portable communication devices.

6. The method of claim 5, wherein transmitting the set of group tactical equipment requirements includes transmitting a group equipment list to each of the plurality of portable communication devices.

7. A system for hierarchically verifying tactical equipment, the system comprising:
   a plurality of portable communication devices associated with a public safety team responding to an incident, the plurality of portable communication devices including a lead device associated with a leader of the public safety team;
   a plurality of tactical equipment, at least one of the plurality of technical equipment wirelessly coupled with each of the plurality of portable communication devices with a plurality of beacons, each of the plurality of beacons associated with one of the plurality of tactical equipment and configured to wirelessly transmit messages indicating a status of its associated tactical equipment to the portable communication device coupled to its tactical equipment; and
   at least one electronic processor configured to
      validate, based on the messages, the at least one of the plurality of tactical equipment wirelessly coupled to each of the plurality of portable communication devices against a set of tactical equipment requirements for a member of the public safety team associated with each respective one of the plurality of portable communication devices;
      validate an acquired set of available tactical equipment for the plurality of portable communication devices against a set of group tactical equipment requirements for the incident;
      generate an alert message in response to determining at least one selected from the group consisting of a failure of at least one of the plurality of portable communication devices to meet its respective set of tactical equipment requirements and a failure of the plurality of portable communication devices to meet the set of group tactical equipment requirements; and
   an electronic transceiver configured to transmit the alert message to the lead device.

8. The system of claim 7, wherein the lead device is configured to display the alert message.

9. The system of claim 7, wherein the set of tactical equipment requirements includes a personal equipment list.

10. The system of claim 7, wherein each of the plurality of portable communication devices includes a personal equipment list.

11. The system of claim 7, wherein the set of group tactical equipment requirements includes a group equipment list.

12. The system of claim 11, wherein the lead device includes a memory, wherein the group equipment list is stored in the memory.

13. The system of claim 7 comprises a tactical equipment management engine, the tactical equipment management engine including the at least one electronic processor.

14. A non-transitory computer-readable medium including instructions executable by an electronic processor to perform a set of functions, the set of functions comprising:
   wirelessly coupling at least one of a plurality of tactical equipment with each of a plurality of portable communication devices using a plurality of beacons, wherein the plurality of portable communication devices associated with a public safety team responding to an incident and each of the plurality of beacons is associated with one of the plurality of tactical equipment and configured to wirelessly transmit messages indicating a status of its associated tactical equipment to the portable communication device coupled to its tactical equipment;

validating, based on the messages, the at least one of the plurality of tactical equipment wirelessly coupled to each of the plurality of portable communication devices against a set of tactical equipment requirements for a member of the public safety team associated with each respective one of the plurality of portable communication devices;

validating an acquired set of available tactical equipment for the plurality of portable communication devices against a set of group tactical equipment requirements for the incident;

responsive to determining at least one selected from the group consisting of a failure of at least one of the plurality of portable communication devices to meet its respective set of tactical equipment requirements and a failure of the plurality of portable communication devices to meet the set of group tactical equipment requirements, generating an alert message; and one of selected from a group consisting of transmitting, via an electronic transceiver, the alert message to the lead device associated with a leader of the public safety team and displaying, at the lead device, the alert message.

15. The non-transitory computer-readable medium of claim 14, wherein determining that at least one of the plurality of portable communication devices fails to meet its respective set of tactical equipment requirements includes comparing a tactical equipment list associated with each of the at least one of the plurality of portable communication devices with at least one of the set of tactical equipment requirements and the set of group tactical equipment requirements.

16. The non-transitory computer-readable medium of claim 14, wherein the set of functions further comprises:
    transmitting a register broadcast signal with the plurality of portable communication devices.

17. The non-transitory computer-readable medium of claim 16, wherein the set of functions further comprises:
    receiving a handshake signal from the plurality of tactical equipment.

18. The non-transitory computer-readable medium of claim 14, wherein the set of functions further comprises:
    transmitting the set of group tactical equipment requirements to each of the plurality of portable communication devices.

19. The non-transitory computer-readable medium of claim 18, wherein transmitting the set of group tactical equipment requirements includes transmitting a group equipment list to each of the plurality of portable communication devices.

* * * * *